(12) United States Patent
Sah

(10) Patent No.: US 7,670,253 B2
(45) Date of Patent: Mar. 2, 2010

(54) CLUTCH CONTROL FOR HYBRID TRANSMISSION

(75) Inventor: Jy-Jen F. Sah, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 428 days.

(21) Appl. No.: 11/688,318

(22) Filed: Mar. 20, 2007

(65) Prior Publication Data

US 2008/0234097 A1 Sep. 25, 2008

(51) Int. Cl.
*B60K 1/02* (2006.01)

(52) U.S. Cl. .................... 477/3; 477/5; 477/6
(58) Field of Classification Search ............ 477/2, 477/3, 5, 6
See application file for complete search history.

(56) References Cited

U.S. PATENT DOCUMENTS

| | | | | |
|---|---|---|---|---|
| 2008/0032855 A1* | 2/2008 | Sah et al. | ........... | 477/3 |
| 2008/0119320 A1* | 5/2008 | Wu et al. | ........... | 477/5 |
| 2008/0305921 A1* | 12/2008 | Falkenstein | ........... | 477/3 |
| 2009/0048747 A1* | 2/2009 | Stridsberg | ........... | 701/55 |

* cited by examiner

*Primary Examiner*—Ha D. Ho

(57) ABSTRACT

A method and system to off-load motive torque from a clutch to execute a transmission shift is provided. The powertrain includes torque-generative devices operably connected to a two-mode, compound-split, hybrid electro-mechanical transmission. The method includes determining a commanded output torque, and a shift command. A first torque is transmitted by electrical motors, and is limited by their torque capacities. A supplemental motive torque is transmitted from an oncoming clutch. The supplemental motive torque is limited by a torque capacity of the oncoming clutch. Output torque of an internal combustion engine to the transmission is adjusted by an amount substantially equal to a difference between the commanded output torque and the first and the supplemental motive torques.

23 Claims, 4 Drawing Sheets

CLUTCH CONTROL FOR HYBRID TRANSMISSION

TECHNICAL FIELD

This invention pertains generally to hybrid powertrain control systems, and more specifically to clutch control related to executing transmission shifts.

BACKGROUND OF THE INVENTION

Various hybrid powertrain architectures are known for managing the input and output torques of various prime-movers in hybrid vehicles, most commonly internal combustion engines and electric machines. One such hybrid powertrain architecture comprises a two-mode, compound-split, electro-mechanical transmission which utilizes an input member for receiving motive torque from a prime mover power source, typically an internal combustion engine, and an output member for delivering motive torque from the transmission to a driveline of the vehicle. First and second electrical machines are operatively connected to an electrical energy storage device for interchanging electrical power therebetween. The first and second electrical machines comprise motor/generators operable to transform the electrical power to motive torque for input to the transmission, independent of torque input from the internal combustion engine. The first and second electrical machines are operable to transform vehicle kinetic energy, transmitted through the vehicle driveline, to electrical energy potential that is storable in the electrical energy storage device. A control unit is provided for regulating the electrical power interchange between the electrical energy storage device and the first and second motor/generators.

Engineers implementing powertrain systems including transmissions are tasked with developing gear shifting schemes. Such transmission systems typically include devices able to operate in one of a plurality of fixed-gear modes, wherein shifting between gears occurs in response to predetermined operating conditions, and often not involving an overt request for shift from a vehicle operator.

An exemplary transmission includes a plurality of torque-transmitting clutches. When a shift change is commanded, torque must be off-loaded from a currently operating clutch associated with operation in a current gear and on-loaded to another clutch associated with operation in another gear.

An ongoing concern for designers of transmission devices is to develop torque-transmitting clutches that are sufficiently large enough to transmit required torque, able to manage temperatures, and meet durability targets, but meet constraints related to packaging envelope, size, and cost. Furthermore, engineers must be cognizant of thermal energy generated during clutch slippage, and effect of such thermal energy on transmission performance and durability.

Therefore, there is a need to for a method and apparatus to offload torque from a currently operating clutch associated with operation in a current gear to address concerns mentioned hereinabove.

SUMMARY OF THE INVENTION

In order to address the concerns raised hereinabove, a method and an article of manufacture are provided to off-load torque from a currently operating clutch, in preparation for executing a transmission shift from an initial gear to a final gear in a transmission of a powertrain system.

To effect a gear change from a first fixed gear to a second fixed gear, it is often necessary to disengage a first clutch that is currently transmitting torque, and engage a second clutch. Disengaging the first clutch is preferably accomplished by first off-load torque. In overall operation, to off-load torque from the currently engaged clutch to effect a shift change, the control system acts to determine a commanded output torque based at least in part upon operator input. A subset of the torque-generative devices, preferably comprising electrical motors, are preferentially controlled to transmit a first motive torque to the transmission substantially equal to the commanded output torque, limited by a torque capacity of the electrical motors. When the torque capacity supplied from the motors is insufficient to meet the commanded output torque, a supplemental motive torque is generated. The supplemental torque, generated using the second, oncoming clutch, is preferably equal to a difference between the commanded output torque and the first motive torque. The supplemental motive torque limited by torque capacity of the oncoming clutch. When the torque capacity supplied from the motors and the oncoming clutch is insufficient to meet the commanded output torque, torque transmitted from a second subset of the torque-generative devices, preferably an engine is reduced by an amount substantially equal to a difference between the commanded output torque and the first and the supplemental motive torques.

The exemplary powertrain system comprises a plurality of torque-generative devices each operable to supply motive torque to the transmission device and vehicle driveline, and the exemplary transmission device comprises a two-mode, compound-split, hybrid electro-mechanical transmission having four fixed gear ratios. There is a plurality of gears operable to transmit torque between the transmission device and an output shaft using a plurality of torque-transfer devices. The torque-generative devices preferably comprise a pair of electrical machines and an internal combustion engine. Torque transmission can be in the form of transmitting motive torque from one of the torque-generative devices through the transmission to the vehicle driveline. Torque transmission can be in the form of transmitting wheel torque resulting from vehicle momentum, through the transmission to one of the torque generative devices, in order to transmit torque to effect electrical generation using one of the electrical machines, or to transmit torque to the internal combustion engine to effect engine braking.

Therefore, in accordance with the present invention there is provided an article of manufacture, comprising a storage medium having a computer program encoded therein for effecting a method to off-load torque from one of a plurality of torque transfer devices of a transmission of a powertrain system, wherein torque is transmitted from at least one of a plurality of torque-generative devices to the transmission through actuation of at least one of the plurality of torque-transfer devices. The computer program comprises a method, including determining a commanded output torque of the powertrain. A first motive torque is preferentially transmitted to the transmission of a magnitude substantially equal to the commanded output torque to the transmission device. The first motive torque is transmitted from torque-generative devices comprising first and second electrical motors, and is limited by torque capacities of the first and second electrical motors. A supplemental motive torque is preferentially supplied to the transmission of a magnitude substantially equal to a difference between the commanded output torque and the first motive torque. The supplemental motive torque is preferably transmitted from an oncoming torque-transfer device. The supplemental motive torque is limited by a torque capacity of the oncoming torque-transfer device. Output torque of the powertrain is adjusted by an amount substantially equal to a difference between the commanded output torque and the first and the supplemental motive torques.

An aspect of the invention includes adjusting the output torque of the powertrain by an amount substantially equal to a difference between the commanded output torque and the first and the supplemental motive torques, which comprises reducing torque transmitted by an internal combustion engine operably connected to the transmission. This includes engine control schemes of reducing fuel delivery, or retarding timing of spark ignition to the internal combustion engine. Alternatively, adjusting output torque of the powertrain can comprise increasing torque transmitted from the internal combustion engine.

Another aspect of the invention comprises preferentially supplying a supplemental motive torque to the transmission by increasing torque capacity of the second torque-transfer device, and increasing a reactive torque of the second torque-transfer device. This includes actuating a clutch control solenoid operable to actuate the second torque transfer device.

Another aspect of the invention comprises determining a commanded output torque of the powertrain by monitoring an operator demand for power. Determining a commanded output torque of the powertrain also comprises determining a torque demand resulting from a controller command to change an operating mode of one of the first and second electrical motors between an electrical energy generating mode and a torque generating mode.

Another aspect of the invention comprises each of the torque-generative devices operable to independently supply motive torque to the transmission device. The transmission is preferably a two-mode, compound-split, electro-mechanical transmission, and the powertrain system is operable to provide motive torque to a driveline of a vehicle.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
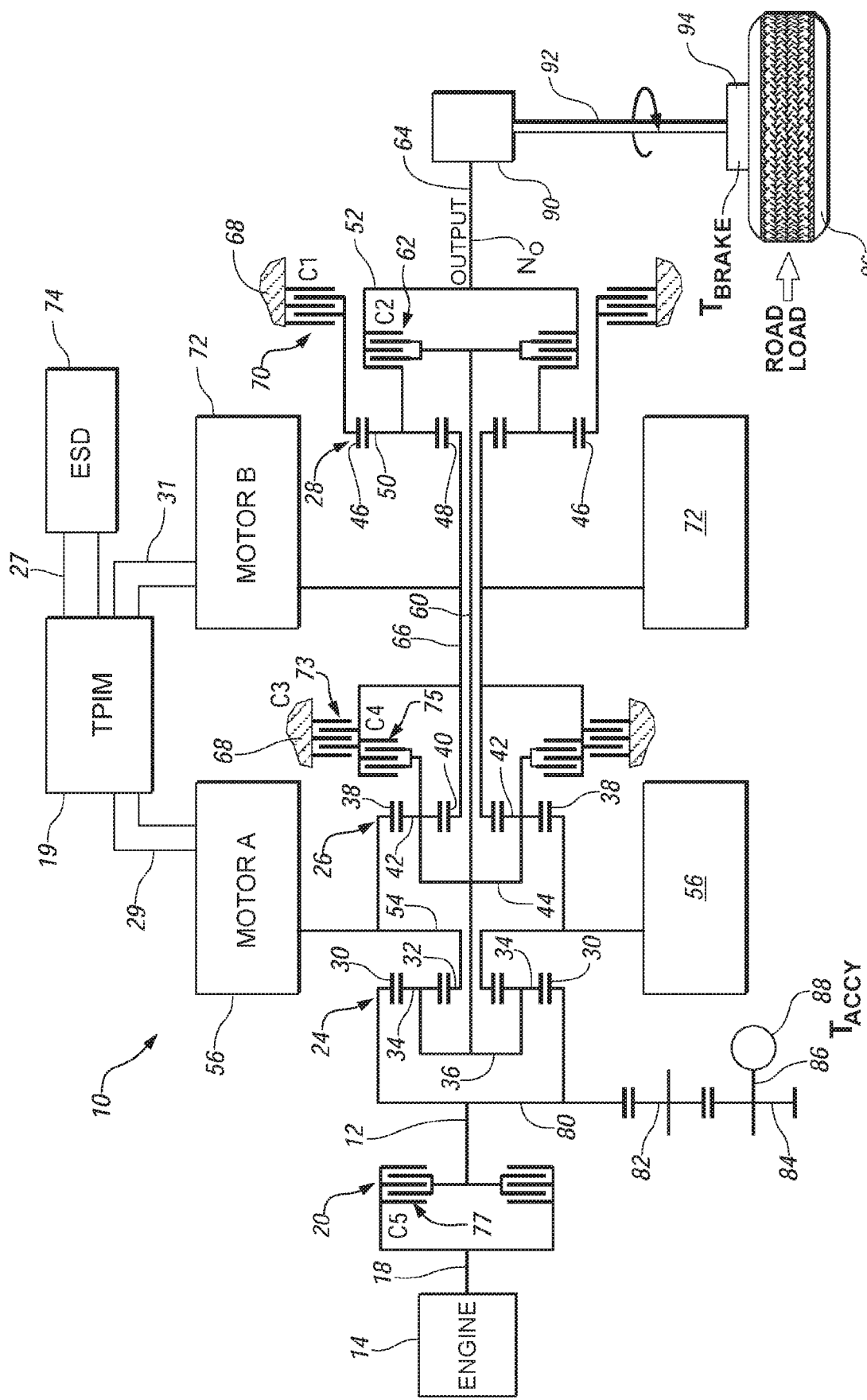
FIG. 1 is a schematic diagram of an exemplary powertrain, in accordance with the present invention.
Figure 2:
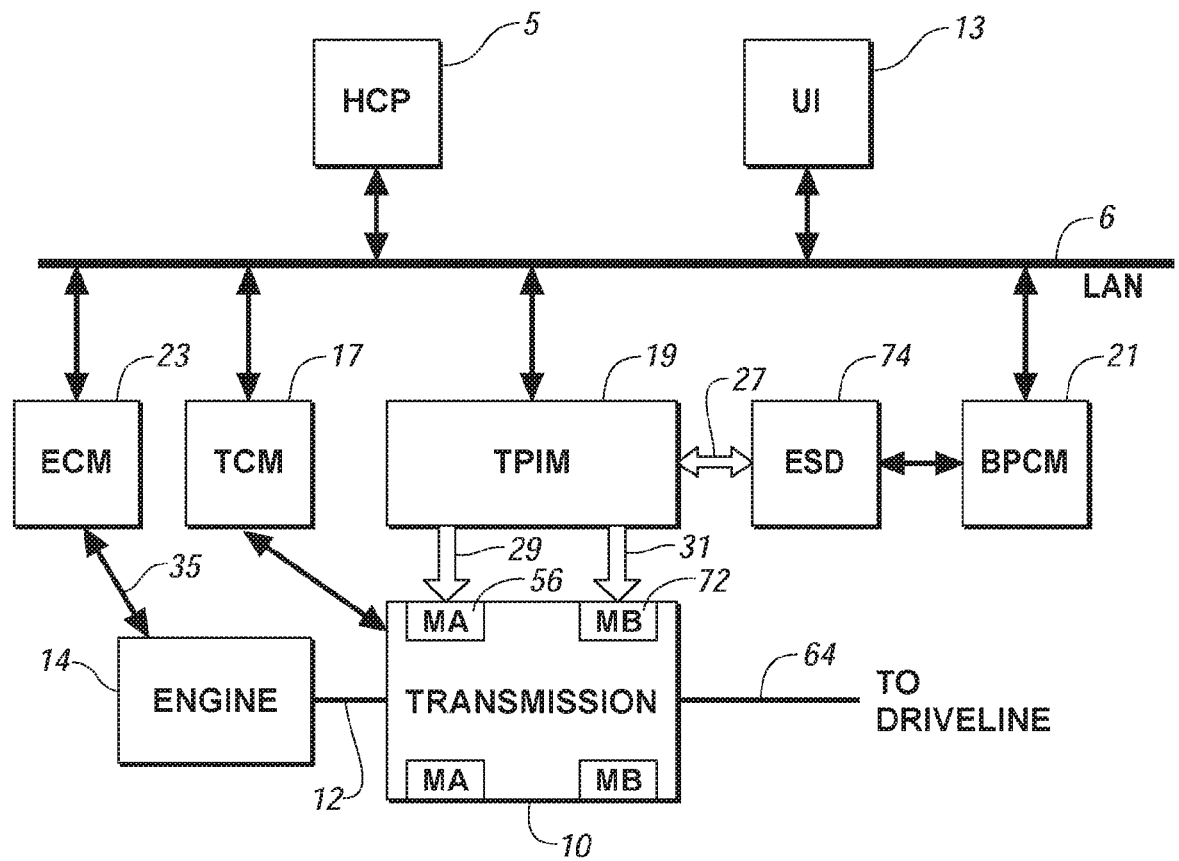
FIG. 2 is a schematic diagram of an exemplary architecture for a controller and powertrain, in accordance with the present invention; and, FIGS. 3-6 are exemplary data graphs, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Patent Application Publication No. U.S. 2005/0137042 A1, published Jun. 23, 2005, entitled Two-Mode, Compound-Split, Hybrid Electro-Mechanical Transmission having Four Fixed Ratios, which is incorporated herein by reference. The exemplary two-mode, compound-split, electro-mechanical hybrid transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper 20 is incorporated between the output shaft 18 of the engine 14 and the input member 12 of the hybrid transmission 10. The transient torque damper 20 preferably comprises a torque transfer device 77 having characteristics of a damping mechanism and a spring, shown respectively as 78 and 79. The transient torque damper 20 permits selective engagement of the engine 14 with the hybrid transmission 10, but it must be understood that the torque transfer device 77 is not utilized to change, or control, the mode in which the hybrid transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the hybrid transmission 10 utilizes three planetary-gear sets 24, 26 and 28. The first planetary gear set 24 has an outer gear member 30 that may generally be designated as a ring gear, which circumscribes an inner gear member 32, generally designated as a sun gear. A plurality of planetary gear members 34 are rotatably mounted on a carrier 36 such that each planetary gear member 34 meshingly engages both the outer gear member 30 and the inner gear member 32.

The second planetary gear set 26 also has an outer gear member 38, generally designated as a ring gear, which circumscribes an inner gear member 40, generally designated as a sun gear. A plurality of planetary gear members 42 are rotatably mounted on a carrier 44 such that each planetary gear 42 meshingly engages both the outer gear member 38 and the inner gear member 40.

The third planetary gear set 28 also has an outer gear member 46, generally designated as a ring gear, which circumscribes an inner gear member 48, generally designated as a sun gear. A plurality of planetary gear members 50 are rotatably mounted on a carrier 52 such that each planetary gear 50 meshingly engages both the outer gear member 46 and the inner gear member 48.

Ratios of teeth on ring gears/sun gears are typically based upon design considerations known to skilled practitioners and outside the scope of the present invention. By way of example, in one embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first electrical machine or motor/generator 56, also referred to as 'Motor A'.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10. The carrier 52 of the third planetary gear set 28 is connected directly to the transmission output member 64.

In the embodiment described herein, wherein the hybrid transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second electrical machine, or motor/generator 72, also referred to as "Motor B".

All the planetary gear sets 24, 26 and 28 as well as the two electrical machines 56 and 72 are coaxially oriented, as about the axially disposed shaft 60. Electrical machines 56 and 72 are both of an annular configuration which permits them to circumscribe the three planetary gear sets 24, 26 and 28 such that the planetary gear sets 24, 26 and 28 are disposed radially inwardly of the electrical machines 56 and 72. This configuration assures that the overall envelope, i.e., the circumferential dimension, of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, electrical machines 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump when a corresponding clutch control solenoid is actuated. Hydraulic actuation of each of the clutches is accomplished using a known hydraulic fluid circuit having a plurality of clutch-control solenoids, which is not described in detail herein.

The hybrid transmission 10 receives input motive torque from a plurality of torque-generative devices, including the engine 14 and the electrical machines 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first electrical machine 56 by transfer conductors 29, and the TPIM 19 similarly communicates with the second electrical machine 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective electrical machine over transfer conductors 29 and 31. In regeneration control, the respective inverter receives AC current from the electrical machine over transfer conductors 29 and 31 and provides current to the DC lines 27. The net DC current provided to or from the inverters determines the charge or discharge operating mode of the electrical energy storage device 74. Preferably, Motor A 56 and Motor B 72 are three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the electrical machines 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and comprise an accessory load.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and motors 56, 72. The distributed controller architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned controllers. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned controllers communicates with other controllers, sensors, and actuators via a local area network ('LAN') bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an engine torque command, $T_{E\_CMD}$; clutch torque commands, $T_{CL\_N\_CMD}$ for the various clutches C1, C2, C3, C4 of the hybrid transmission 10; and motor torque commands, $T_{A\_CMD}$ and $T_{B\_CMD}$, for the electrical motors A and B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command, $T_{E\_CMD}$, from the HCP 5, and generates a desired axle torque, $T_{AXLE\_DES}$, and an indication of actual engine torque, $T_{E\_ACT}$, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_E$) to a shaft leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques, $T_{CL\_N\_EST}$, for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, Bat_SOC, and other states of the batteries, including voltage, $V_{BAT}$, and available power, $P_{BAT\_MIN}$ and $P_{BAT\_MAX}$.

The Transmission Power Inverter Module (TPIM) 19 includes a pair of power inverters and motor controllers configured to receive motor control commands and control inverter states therefrom to provide motor drive or regeneration functionality. The TPIM 19 is operable to generate torque commands for Motors A and B, $T_{A\_CMD}$ and $T_{B\_CMD}$, based upon input from the HCP 5, which is driven by operator input through UI 13 and system operating parameters. The predetermined torque commands for Motors A and B, $T_{A\_CMD}$ and $T_{B\_CMD}$, are adjusted with motor damping torques, $T_{A\_DAMP}$ and $T_{B\_DAMP}$, to determine motor torques, $T_A$ and $T_B$, which are implemented by the control system, including the TPIM 19, to control the motors A and B. Individual motor speed signals, $N_A$ and $N_B$ for Motor A and Motor B respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP controller 5 and one or more of the other controllers determine required transmission output torque, $T_O$. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical hybrid transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
|---|---|---|
| Mode I | C1 70 | |
| Fixed Ratio 1 | C1 70 | C4 75 |
| Fixed Ratio 2 | C1 70 | C2 62 |

TABLE 1-continued

| Transmission Operating Mode | Actuated Clutches | |
| --- | --- | --- |
| Mode II | C2 62 | |
| Fixed Ratio 3 | C2 62 | C4 75 |
| Fixed Ratio 4 | C2 62 | C3 73 |

The various transmission operating modes described in the table indicate which of the specific clutches C1, C2, C3, C4 are engaged or actuated for each of the operating modes. Additionally, in various transmission operating modes, Motor A 56 or Motor B 72 may each operate as electrical motors, designated as MA, MB respectively, and whether motor A 56 is operating as a generator, designated as GA. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the electrical machines 56 and 72. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved. The rotations of the electrical machines 56, 72 are dependent on internal rotation of the mechanism as defined by the clutching and proportional to the input speed, $N_I$, determined or measured at shaft 12. The motor/generators function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from Motors A and B, through planetary gear set 28 by accepting power from the energy storage device 74.

The transmission operating mode can be switched between Fixed Ratio operation and Mode operation by activating or deactivating one the additional clutches during Mode I or Mode II operation. Determination of operation in fixed ratio or mode control is by algorithms executed by the control system, and is outside the scope of this invention.

The modes of operation may overlap the ratio of operation, and selection depends again on the driver's input and response of the vehicle to that input. RANGE 1 falls primarily within mode I operation when clutches C1 70 and C4 75 are engaged. RANGE 2 falls within mode I and mode II when clutches C2 62 and C1 70 are engaged. A third fixed ratio range is available primarily during mode II when clutches C2 62 and C4 75 are engaged, and a fourth fixed ratio range is available during mode II when clutches C2 62 and C3 73 are engaged. It is notable that ranges of operation for Mode I and Mode II typically overlap significantly.

Output of the exemplary powertrain system described hereinabove is constrained due to mechanical and system limitations. The output speed, $N_O$, of the transmission measured at shaft 64 is limited due to limitations of engine output speed, $N_E$, measured at shaft 18, and transmission input speed, $N_I$, measured at shaft 12, and speed limitations of the electric motors A and B, designated as $+/-N_A$, $+/-N_B$. Output torque, $T_O$, of the transmission 64 is similarly limited due to limitations of the engine input torque, $T_E$, and input torque, $T_I$, measured at shaft 12 after the transient torque damper 20, and torque limitations ($T_{A\_MAX}$, $T_{A\_MIN}$, $T_{B\_MAX}$, $T_{B\_MIN}$) of the motors A and B 56, 72.

In operation, a shift occurs in the exemplary transmission due to a change in operator demand for output torque, typically communicated through inputs to the UI 13, including the accelerator pedal, the brake pedal, the transmission gear selector, and, the vehicle speed cruise control system. Additionally, a change in demand for output torque may be predicated on a change in external conditions, including, e.g. changes in road grade, road surface conditions, or wind load. Furthermore, a change in demand for output torque may be predicated on a change in powertrain torque demand caused by a controller command to change one of the electrical machines between electrical energy generating mode and torque generating mode. The distributed control architecture acts in concert to determine a need for a change in transmission operating gear, and executes the forgoing to effect the change in gear.

Referring now to FIGS. 3-6, a graphical depiction of an element of a fixed gear-to-fixed gear shifting event is now described, comprising off-loading transmitted torque from one of the torque-transfer devices comprising friction clutches C1 70, C2 62, C3 73, and C4 75. This action is preferably executed as one or more coded algorithms in the distributed control architecture to control and manage operation of the aforementioned powertrain and driveline system.

To effect a gear change from a first fixed gear to a second fixed gear, it is often necessary to disengage a first clutch that is currently transmitting torque, and engage a second clutch, as shown in Table 1. Disengaging the first clutch is preferably accomplished by first off-load torque. In overall operation, to off-load torque from the currently engaged clutch (i.e., C1, C2, C3, C4) to effect a shift change, the control system described hereinabove acts to determine a commanded output torque based at least in part upon operator input. A subset of the torque-generative devices, preferably the electrical motors 56, 72, are preferentially controlled to transmit a first motive torque to the transmission substantially equal to the commanded output torque, limited by a torque capacity of the electrical motors. When the torque capacity supplied from the motors 56, 72 is insufficient to meet the commanded output torque, a supplemental motive torque is generated. The supplemental torque, generated using the second, oncoming clutch, is preferably equal to a difference between the commanded output torque and the first motive torque. The supplemental motive torque limited by torque capacity of the oncoming clutch. When the torque capacity supplied from the motors 56, 72 and the oncoming clutch is insufficient to meet the commanded output torque, torque transmitted from a second subset of the torque-generative devices, preferably the engine 14, is reduced by an amount substantially equal to a difference between the commanded output torque and the first and the supplemental motive torques. In operation, the control system is preferably operable to determine the first motive torque, the supplemental motive torque, and the torque reduction substantially simultaneously, in order to limit the amount of time the transmission requires for shifting. This is described in greater detail hereinbelow.

In operation, a commanded output torque, $T_{O\_CMD}$ of the powertrain is determined. A first motive torque is preferentially supplied as input to the transmission 10 from the first and second electrical motors 56 and 72, substantially equal to the commanded output torque to the transmission device. The first motive torque is limited by torque-generative capacities of the first and second electrical motors, $T_A$, $T_B$. A supplemental motive torque, referred to as $T_{C\_ON}$, is transmitted to the transmission from an oncoming torque-transfer device. The supplemental motive torque $T_{C\_ON}$ is substantially equal to a difference between the commanded output torque, $T_{O\_CMD}$, and the first motive torque, comprising $T_A$, $T_B$. The supplemental motive torque $T_{C\_ON}$ is limited by torque capacity of the oncoming torque-transfer device, i.e. maximum $T_{C\_ON}$. When the first motive torque, comprising $T_A$, $T_B$ and the supplemental motive torque $T_{C\_ON}$ are insufficient to meet the commanded motive torque, $T_{O\_CMD}$, the control system acts to reduce the output torque, $T_O$, of the transmission by an amount equal to the difference. This is now described in detail.

The commanded output torque, $T_{O\_CMD}$ of the powertrain is determined based upon operator input through the UI 13 and other powertrain and system commands related to demands for power arising from charging and discharging the electrical energy storage device (ESD) 74.

Figure 3:
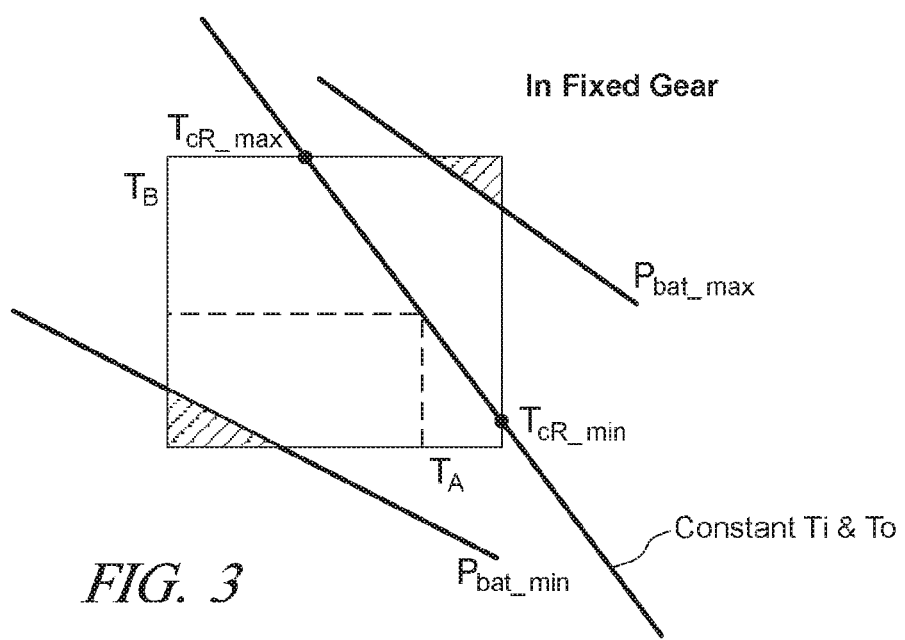
Figure 4:
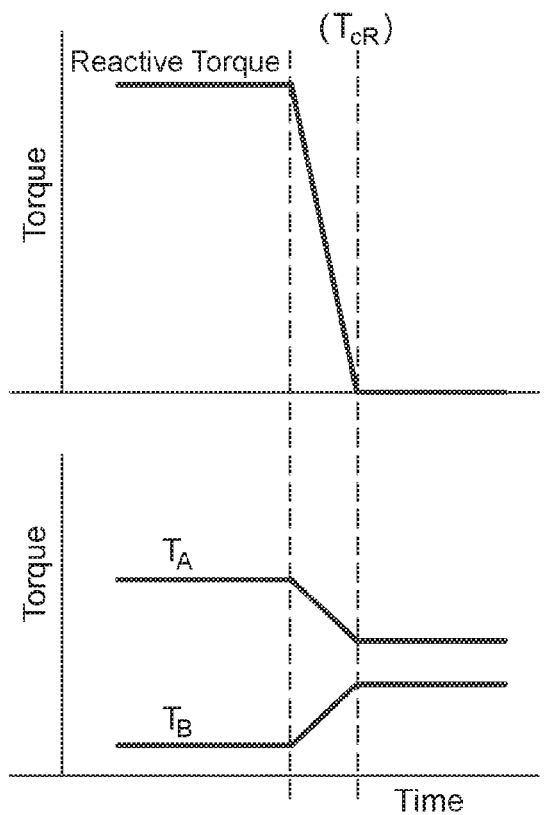
Figure 5:
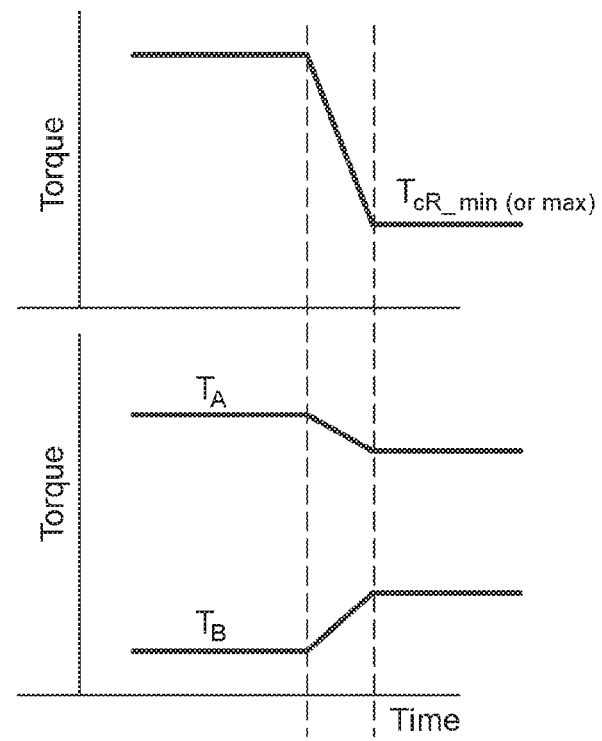
Figure 6:
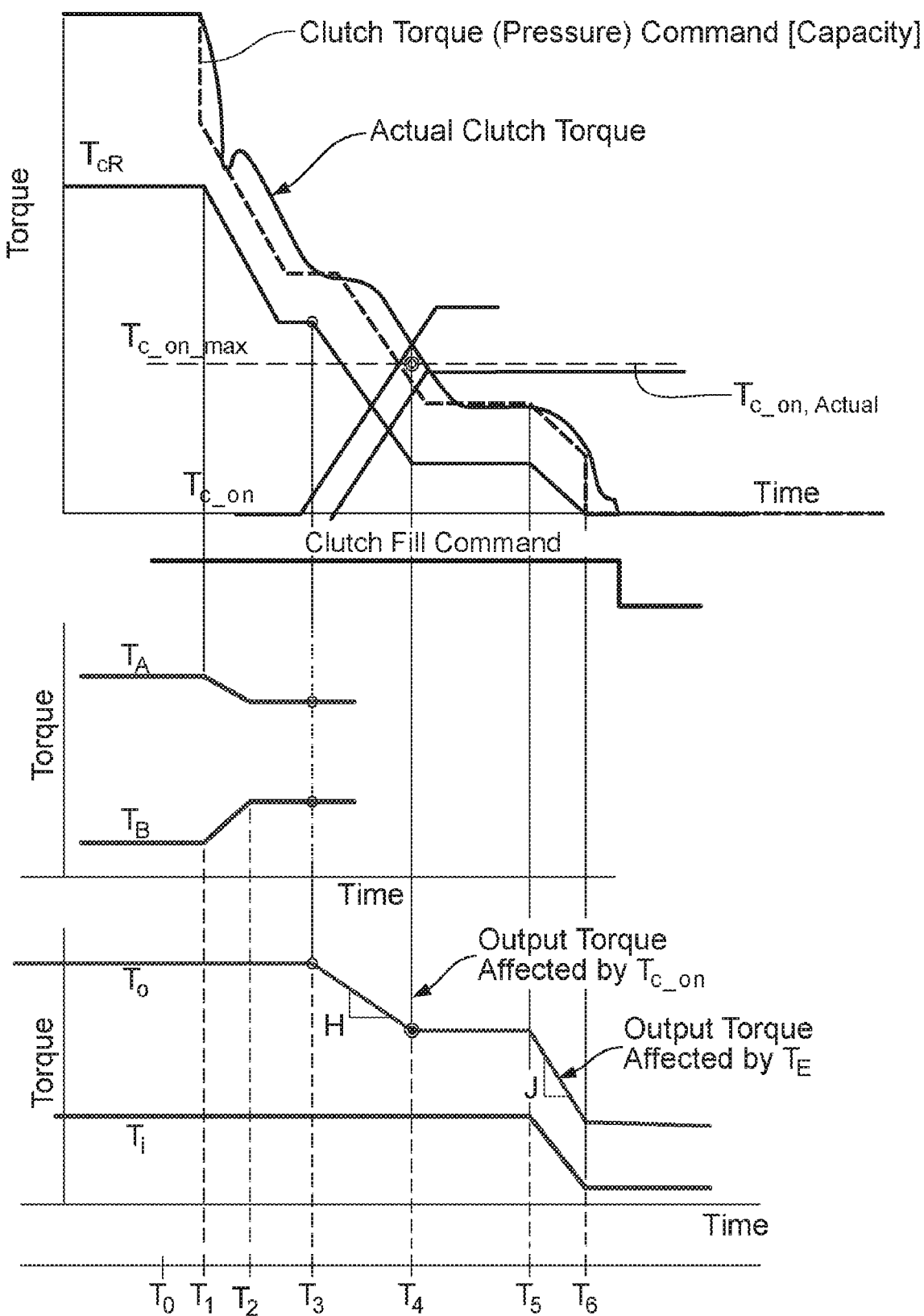

Referring now to FIG. 3, a data-graph of operating ranges of the electrical motors A, B is shown, wherein the x-axis comprises a range of output torque parameters for Motor A 56, and the y-axis comprises a range of torque values for Motor B 72. The range of available operating torque parameters for Motors A and B are limited by available power based upon minimum and maximum battery power, referred to as $P_{BAT\_MIN}$ and $P_{BAT\_MAX}$. These limits are shown as lines on the graphs. For operation in a fixed transmission gear, maximum and minimum clutch reactive torque values, $TcR\_MAX$, $TcR\_MIN$, are determined for predetermined input and output torque parameters, $T_I$, $T_O$.

Reactive torque is defined as a magnitude of torque transmitted through a torque-transfer device, i.e. a clutch. Torque capacity is defined as a maximum amount of torque transmissible across a clutch, and is generally based upon magnitude of clutch pressure and clutch friction. When the magnitude of clutch torque exceeds the torque capacity, clutch slip occurs. The reactive torque is always less than or equal to the torque capacity. Clutch pressure is created by controlling magnitude of hydraulic pressure applied to the clutch by the hydraulic circuit of the transmission.

To off-load a specific torque-transmitting clutch, the clutch reactive torque has preferably reached a value substantially equal to zero, i.e. no torque is being transmitted between the torque-generating devices and the vehicle driveline across the specific clutch. When the $TcR\_MIN$ value is a negative torque, and the $TcR\_MAX$ value is a positive torque, then a net reactive torque of zero is achievable using only torque outputs from Motor A and Motor B. This is shown as points along the constant $T_I$, $T_O$ line between $TcR\_MAX$ and $TcR\_MIN$ on FIG. 3. In this situation, the control system commands the TPIM controller 19 to transfer sufficient quantity of electrical energy to Motors A 56 and B 72 such that their outputs comprise appropriate operating points to generate input torques $T_A$, $T_B$ for input to the transmission device 10. When Motors A and B reach desired input torques $T_A$, $T_B$, the clutch reactive torque is at zero, and the off-going clutch can be deactivated without additional actions. Such action is shown graphically with reference now to FIG. 4.

When the $TcR\_MAX$, $TcR\_MIN$ values are both negative torques, or the $TcR\_MAX$, $TcR\_MIN$, values are both positive torques, then a net reactive torque of zero can not be achieved using only torque outputs from Motor A and Motor B. This is shown with reference now to FIG. 5. In this scenario, a supplemental motive torque is preferentially supplied, comprising torque transmitted from an oncoming torque-transfer device, i.e. one of friction clutches C1 70, C2 62, C3 73, and C4 75. Magnitude of the supplemental motive torque is substantially equal to a difference between the commanded output torque and the first motive torque, and, limited by a torque capacity of the oncoming torque-transfer device.

To generate the supplemental motive torque, Motors A and B are commanded to generate a minimum torque value $TcR\_MIN$ that is achievable at the current operating point, when both motor torque values, $T_A$, $T_B$, are positive torques, as determinable with reference again to results shown in the data-graph of FIG. 3. Alternatively, Motors A and B can be commanded to generate a maximum torque value $TcR\_MAX$ that is achievable at the current operating point, when both motor torque values, $T_A$, $T_B$, are negative torques. The intent is to control motor torques $T_A$, $T_B$ to minimum absolute values.

When the motor torques $T_A$, $T_B$ are controlled to, or are about to achieve the minimum absolute values, a clutch-fill command is executed for the oncoming clutch, and the oncoming clutch is commanded on. The oncoming clutch generates supplemental motive torque $T_{C\_ON}$ which increases up to a value equal to the reactive torque of the off-going clutch, with an upper limit being a maximum value of the clutch torque capacity, referred to as $T_{C\_ON\_MAX}$.

When input torques $T_A$, $T_B$, from motors A and B, combined with the supplemental motive torque $T_{C\_ON}$ are equal to the commanded output torque, then the reactive torque of the off-going clutch is at zero, and the off-going clutch can be deactivated without additional actions.

When the reactive torque of the off-going clutch exceeds the input torques $T_A$, $T_B$, from motors A and B combined with the supplemental motive torque $T_{C\_ON}$, then there is a need to reduce output torque of the powertrain, $T_O$, in order to accomplish the off-loading of the clutch, in order to permit a shift to another gear. The reduction in output torque of the powertrain, $T_O$, generally comprises reducing the input torque, $T_I$, by an amount equal to remaining reactive torque determined after combination of input torques $T_A$, $T_B$, from motors A and B, and the supplemental motive torque $T_{C\_ON}$, to achieve the desired output torque, $T_O$. Reducing the input torque $T_I$ generally comprises reducing engine torque, $T_E$, by an amount equal to a calculated difference. Preferably the engine torque is reduced in a ramped manner to minimize effect upon operator perception, and to reduce risk that the operator takes corrective actions that interfere with the off-loading event. This is shown on the $T_O$ line, between $T_5$ and $T_6$, and identified by letter "J" in FIG. 6. Reducing engine torque can be accomplished by the control system by implementing such known actions as reducing fueling to the engine, or retarding spark, or by adjusting fuel delivery times, on vehicle systems equipped with such capabilities.

Referring again to FIG. 6, overall operation as a function of time is detailed. In response to a command to offload torque, there is a command to reduce clutch reactive torque by off-loading the clutch reactive torque using Motors A and B. First motive torque is commanded to be output from Motors A and B, comprising output torques $T_A$, $T_B$, shown at time T1. Torque capacities of Motors A and B are achieved at time T2, wherein it is shown that actual clutch torque is still greater than zero in this example. Therefore, supplemental motive torque is transmitted from the oncoming clutch, $T_{C\_ON}$, starting at time T3. The oncoming clutch torque, $T_{C\_ON}$, is preferably ramped up to a maximum value, $T_{C\_ON\_MAX}$, equal to the torque capacity of the oncoming clutch, at time T4. It is shown in this example that the actual clutch torque remains greater than zero in this example. Therefore, in this example the input torque, Ti, to the transmission is reduced in a ramped reduction, starting at time T5, until clutch torque is substantially equal to zero torque transmitted across the off-going clutch, shown at time T6. Typically, reducing input torque, Ti, is achieved by reducing the engine torque, $T_E$, using known engine output torque management techniques including reducing fueling to the engine, or retarding spark.

It is understood that application-specific masses, inertias, friction factors, and other characteristics and parameters of the driveline affect various powertrain and driveline operating states, and therefore the response times and magnitudes are intended to be exemplary, while still descriptive of the overall operation of the powertrain system.

As previously described, the transmission device 10 comprises a plurality of gears and torque-transfer devices operable to transmit torque between the torque-generative devices 14, 56, 72 and the output shaft 64 and drive wheels 96 of the driveline. Torque transmission may comprise transfer of motive torque from one or more of the torque-generative devices 14, 56, 72 to the driveline. Torque transmission may comprise transfer of torque from the drive wheels 96 via the driveline and transmission to one or more of the torque-generative devices 14, 56, 72 as a result of a process commonly referred to as engine-braking. In this configuration, engine-braking comprises transmitting at least a portion of driveline torque resulting from vehicle momentum from the output shaft 64 through torque-transfer devices, i.e., clutches C1, C2, C3, C4, to the torque-generative devices 14, 56, 72. The transmitted torque is absorbed by the powertrain in the form of electrical energy generation through the motor/generators 56, 72, and, engine braking through the internal combustion engine 14.

It is understood that modifications in the transmission hardware are allowable within the scope of the invention. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Article of manufacture, comprising a storage medium having a computer program encoded therein for effecting a method to off-load torque to a torque transfer device of a transmission, said torque transmitted from one of a plurality of torque-generative devices, the computer program comprising:

code for determining a commanded output torque of the transmission;

code for preferentially transmitting a first motive torque from a first subset of the torque-generative devices to the transmission;

code for preferentially transmitting a supplemental motive torque to the transmission substantially equal to a difference between the commanded output torque and the first motive torque, said supplemental motive torque transmitted from an oncoming torque-transfer device; and, code for adjusting torque transmitted from a second subset of the torque-generative devices by an amount substantially equal to a difference between the commanded output torque and the first and the supplemental motive torques.

2. The article of manufacture of claim 1, wherein the code for preferentially transmitting the first motive torque from the first subset of torque-generative devices to the transmission further comprises said first motive torque substantially equal to the commanded output torque of the transmission.

3. The article of manufacture of claim 2, wherein said first motive torque is limited by torque-generative capacity of the first subset of torque-generative devices.

4. The article of manufacture of claim 3, wherein the first subset of torque-generative devices comprises first and second electrical machines.

5. The article of manufacture of claim 1, wherein the code for preferentially transmitting the supplemental motive torque to the transmission substantially equal to the difference between the commanded output torque and the first motive torque further comprises said supplemental motive torque transmitted from an oncoming torque-transfer device.

6. The article of manufacture of claim 5, further comprising: said supplemental motive torque limited by a torque capacity of the oncoming torque-transfer device.

7. The article of manufacture of claim 6, wherein the code for preferentially transmitting supplemental motive torque to the transmission transmitted from the oncoming torque-transfer device further comprises:

code for increasing a torque capacity of a second torque-transfer device; and, code for increasing a reactive torque of the second torque-transfer device.

8. The article of manufacture of claim 7, wherein the code for increasing torque capacity of the second torque-transfer device comprises code for actuating a clutch control solenoid operable to actuate the second torque transfer device.

9. The article of manufacture of claim 1, wherein the code for adjusting torque transmitted from the second subset of the plurality of torque-generative devices by the amount substantially equal to the difference between the commanded output torque and the first and the supplemental motive torques comprises code for reducing torque transmitted from an internal combustion engine operably connected to the transmission.

10. The article of manufacture of claim 9, further comprising code for reducing fuel delivered to the internal combustion engine.

11. The article of manufacture of claim 9, further comprising code for retarding timing of spark ignition to the internal combustion engine.

12. The article of manufacture of claim 1, wherein the code for adjusting torque transmitted from the second subset of the plurality of torque-generative devices by the amount substantially equal to the difference between the commanded output torque and the first and the supplemental motive torques comprises code for increasing torque transmitted from an internal combustion engine operably connected to the transmission.

13. The article of manufacture of claim 12, wherein the code for determining the commanded output torque of the transmission comprises code for monitoring an operator demand for power.

14. The article of manufacture of claim 1, wherein each of the torque-generative devices is operable to independently supply motive torque to the transmission.

15. The article of manufacture of claim 1, wherein the transmission comprises a two-mode, compound-split, electro-mechanical transmission.

16. The article of manufacture of claim 15, wherein the two-mode, compound-split, electro-mechanical transmission comprises a transmission comprising four torque-transfer devices operative to control the transmission in operating ranges of at least four fixed-gear modes and two modes.

17. The article of manufacture of claim 16, wherein the transmission is operable to provide motive torque to a driveline of a vehicle.

18. Method to off-load torque to a torque transfer device of a transmission, said torque transmitted from one of a plurality of torque-generative devices to the transmission, comprising:
   determining a commanded output torque of the transmission;
   preferentially transmitting a first motive torque to the transmission from a first subset of torque-generative devices;
   preferentially transmitting a supplemental motive torque to the transmission substantially equal to a difference between the commanded output torque and the first motive torque, said supplemental motive torque transmitted from an oncoming torque-transfer device; and,
   adjusting torque transmitted from a second subset of the torque-generative devices by an amount substantially equal to a difference between the commanded output torque and the first and the supplemental motive torques.

19. The method of claim 18, comprising limiting said first motive torque from the first subset of torque-generative devices by a torque-generative capacity thereof.

20. The method of claim 18, wherein the preferentially transmitting the supplemental motive torque to the transmission transmitted from the oncoming torque-transfer device further comprises:
   increasing torque capacity of a second torque-transfer device; and,
   increasing a reactive torque of the second torque-transfer device.

21. Control system for a powertrain comprising a plurality of torque-generative devices and a transmission device, the transmission device having a plurality of torque-transfer devices to effect a method to offload torque transmitted through one of the torque-transfer devices, the controller operable to:
   determine a commanded output torque;
   preferentially control a first subset of the torque-generative devices to transmit a first motive torque to the transmission substantially equal to the commanded output torque, said first motive torque limited by a torque capacity of the first subset of torque-generative devices;
   preferentially control an oncoming torque-transfer device to effect transmission of a supplemental motive torque to the transmission, said supplemental motive torque substantially equal to a difference between the commanded output torque and the first motive torque, said supplemental motive torque limited by a torque capacity of the oncoming torque-transfer device; and,
   adjust output torque transmitted from a second subset of the torque-generative devices by an amount substantially equal to a difference between the commanded output torque and the first and the supplemental motive torques.

22. The control system of claim 21, wherein the controller is operable a shift in the transmission from a first fixed gear to a second fixed gear.

23. The control system of claim 21, further comprising the controller operable to determine the first motive torque, the supplemental motive torque, and the adjusted output torque substantially simultaneously.

* * * * *